(12) United States Patent
Do et al.

(10) Patent No.: US 10,361,573 B2
(45) Date of Patent: Jul. 23, 2019

(54) BATTERY PACK

(71) Applicant: SAMSUNG SDI CO., LTD., Yongin-si, Gyeonggi-do (KR)

(72) Inventors: Hyun-Jun Do, Yongin-si (KR); Hwa-Su Kim, Yongin-si (KR); Cheol-Gi Son, Yongin-si (KR); Dong-Rak Kim, Yongin-si (KR); Kwang-Min Yoo, Yongin-si (KR); In-Seob Song, Yongin-si (KR); Jeong-Kurn Park, Yongin-si (KR); Su-Jun Park, Yongin-si (KR); Jong-Rock Choi, Yongin-si (KR); Jun-Young Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 256 days.

(21) Appl. No.: 14/825,627

(22) Filed: Aug. 13, 2015

(65) Prior Publication Data

US 2016/0172888 A1 Jun. 16, 2016

(30) Foreign Application Priority Data

Dec. 11, 2014 (KR) .................. 10-2014-0178622

(51) Int. Cl.
*H02J 7/00* (2006.01)
*H01M 10/42* (2006.01)
*H01M 16/00* (2006.01)

(52) U.S. Cl.
CPC ......... *H02J 7/0063* (2013.01); *H01M 10/425* (2013.01); *H01M 16/00* (2013.01); *H02J 2007/0067* (2013.01)

(58) Field of Classification Search
CPC ..................................................... H02J 7/0063
See application file for complete search history.

(56) References Cited

U.S. PATENT DOCUMENTS

| | | | | | |
|---|---|---|---|---|---|
| 4,025,860 | A | * | 5/1977 | Shibata | ............... B60L 11/1853 180/65.1 |
| 4,056,764 | A | * | 11/1977 | Endo | ....................... B60L 15/04 318/139 |
| 9,276,469 | B2 | * | 3/2016 | Platania | ................ H02M 3/158 |
| 2006/0271701 | A1 | * | 11/2006 | Sutardja | ................ G06F 1/1613 709/238 |

(Continued)

FOREIGN PATENT DOCUMENTS

| | | | | |
|---|---|---|---|---|
| JP | 07143677 | * | 6/1995 | ................ H02J 7/00 |
| KR | 10-2007-0082542 | | 8/2007 | |

(Continued)

OTHER PUBLICATIONS

JP07143677 translation, Sugano, Variable power supply has control device for detecting variation of output current, using whichvariable resistance is adjusted, Jun. 1995.*

*Primary Examiner* — Robert J Grant
*Assistant Examiner* — Tynese V McDaniel
(74) *Attorney, Agent, or Firm* — Lee & Morse, P.C.

(57) ABSTRACT

A battery pack includes a first battery with a first capacity, a second battery with a second capacity less than the first capacity, and a variable resistor. The second battery has a larger maximum discharge current than the first battery. The variable resistor circuit limits the discharge current of the first battery to a predetermined limit current value.

8 Claims, 7 Drawing Sheets

(56) References Cited

U.S. PATENT DOCUMENTS

| | | | |
|---|---|---|---|
| 2007/0188139 A1 | 8/2007 | Hussain et al. | |
| 2009/0212626 A1 | 8/2009 | Snyder et al. | |
| 2009/0278497 A1* | 11/2009 | Kim | H02J 7/0016 |
| | | | 320/126 |
| 2012/0038212 A1* | 2/2012 | Arata | H02J 3/32 |
| | | | 307/46 |
| 2012/0326671 A1* | 12/2012 | Krause | H01M 10/44 |
| | | | 320/126 |
| 2014/0306519 A1 | 10/2014 | Song | |
| 2015/0222132 A1* | 8/2015 | Shikatani | H01M 10/441 |
| | | | 320/117 |

FOREIGN PATENT DOCUMENTS

| | | |
|---|---|---|
| KR | 10-2010-0079725 A | 7/2010 |
| KR | 10-2010-0133993 | 12/2010 |
| KR | 10-2013-0042088 | 4/2013 |

\* cited by examiner

BATTERY PACK

CROSS-REFERENCE TO RELATED APPLICATION

Korean Patent Application No. 10-2014-0178622, filed on Dec. 11, 2014, and entitled, "Battery Pack," is incorporated by reference herein in its entirety.

BACKGROUND

1. Field

One or more embodiments described herein relate to a battery pack.

2. Description of the Related Art

A heterogeneous battery pack includes a high capacity battery and a high output battery. The high capacity battery performs a long-term output function, and the high output battery performs a frequent output function. In order to control a heterogeneous battery pack, a DC/DC converter may be used. The DC/DC converter may include, for example, a buck converter and a boost converter. When a DC/DC converter is used, a large capacity converter design may control the battery pack. However, the large capacity converter may increase the cost of the battery pack.

SUMMARY

In accordance with one or more embodiments. a battery pack includes a first battery with a first capacity; a second battery with a second capacity less than the first capacity, the second battery having a larger maximum discharge current than the first battery; and a variable resistor circuit to limit a discharge current of the first battery to a predetermined limit current value. The first battery and the second battery may be connected in parallel. When a total current supplied to a load by the first and second batteries may be increased, a discharge current of the second battery is increased and the discharge current of the first battery is maintained based on the predetermined limit current value. The predetermined limit current value may correspond to a maximum discharge current of the first battery. The variable resistor circuit may be serially connected between the first battery and a load.

In accordance with one or more other embodiments, a battery pack includes a high capacity battery with a first capacity; a high output battery having a second capacity less than the first capacity, the high output battery having a higher output than the high capacity battery; and a variable resistor circuit to limit an output of the high capacity battery.

The variable resistor circuit may include a plurality of sub controllers which have substantially similar structures. The sub controllers may include switches and the switches are to be turned on or turned off based on respective sub currents. The sub currents may be output by corresponding switching controllers, and the switching controllers may operate based on battery average currents of the sub controllers, respectively.

Each of the switching controllers may include a controller to output a comparison voltage based on the battery average current; and a transmitter to output a corresponding one of the sub currents based on the comparison voltage. The controller may compare a power supply voltage and a corresponding battery average current, and output the comparison voltage. The transmitter may compare alternating current power and the comparison voltage and to output a corresponding one of the sub currents. Each sub controller may include a filter to remove a high frequency pulse from the current flowing in the sub controller.

In accordance with one or more other embodiments, a battery pack includes a first battery with a first capacity and a first discharge current; a second battery with a second capacity less than the first capacity and a second discharge current greater than the first discharge current; and a controller to control a discharge current of the first battery, wherein the first battery is connected in parallel to the second battery and wherein the controller is to control the discharge current of the first battery to within a predetermined range, a maximum value of the predetermined range less than a maximum discharge current value of the first battery.

When a total current to be supplied to a load by the first and second batteries is increased, a discharge current of the second battery may be increased and the discharge current of the first battery is maintained within the predetermined range. The controller may include a resistance circuit. The resistor circuit may be a variable resistor circuit having a resistance which is to change to maintain the discharge current of the first battery within the predetermined range. The first battery may include a plurality of batteries, and the variable resistance circuit may include a plurality of variable resistors to control discharge current of respective ones of the batteries. The battery pack may include a filter to remove a pulse of a predetermined frequency from the discharge current of the first battery.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
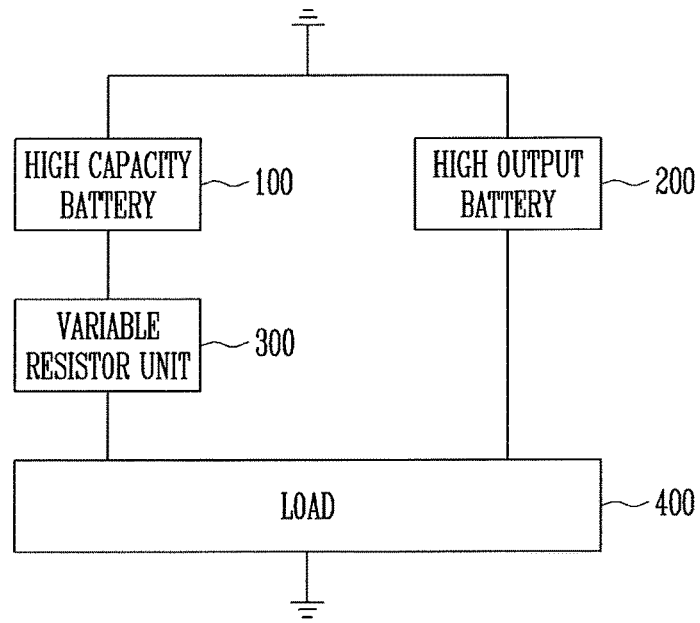
FIG. 1A illustrates an embodiment of a battery pack.

Example embodiments are more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1A illustrates an embodiment of a battery pack 1000 which includes a high capacity battery 100, a high output battery 200, a variable resistor unit 300, and a load 400. The high capacity battery 100 may include one or more batteries for performing a long-term output function. The high output battery 200 performs a frequent output function. The high output battery 200 may include one or more batteries than the high capacity battery 100. In one embodiment, the high output battery 200 may have fewer batteries than the high capacity battery 100. In one embodiment, the high capacity battery 100 may have a high capacity output rather than high output.

When the high capacity battery 100 generates high output, the life cycle of the high capacity battery 100 may decrease by an amount proportional to the high output. The variable resistor unit 300 may be operated by a phase transition method in order to limit the output current of the high capacity battery 100. For example, the variable resistor unit 300 may limit the maximum current of the high capacity battery 100 by a variable resistance method and the remaining output is generated by the high output battery 200. Accordingly, the life cycle of the high capacity battery 100 may be extended by limiting its current using the variable resistor unit 300.

Figure 1B:
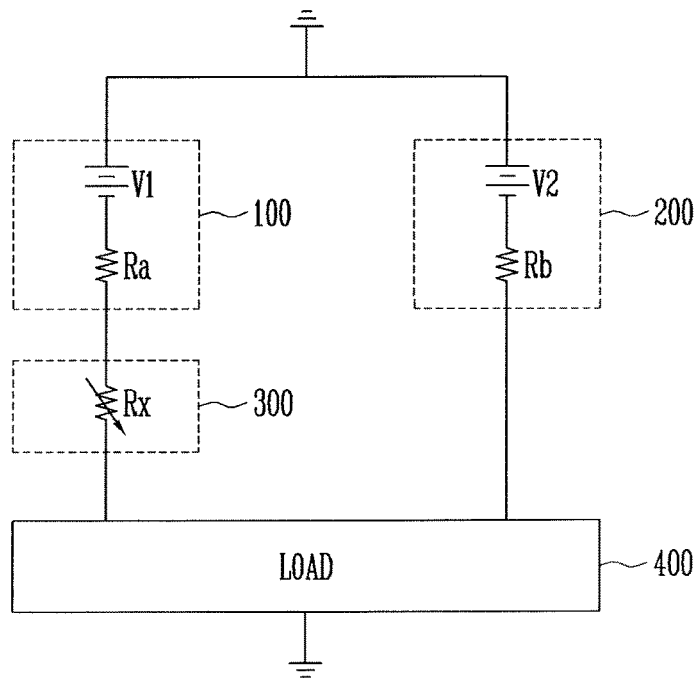
FIG. 1B illustrates an example for describing a variable resistance value of the battery pack.

FIG. 1B illustrates an example of the variable resistance value of the battery pack 1000. Referring to FIG. 1B, the minimum resistance value Rx of the variable resistance of the variable resistor unit 300 may be calculated based on Equation 1.

$$Rx = Rs(1 - \text{Duty}) \quad (1)$$

Referring to Equation 1, the minimum resistance value Rx of the variable resistance proportional to the variable resistance Rs and a duty ratio of one or more switches. Equation 1 may be expressed in greater detail by Equation 2.

$$Rx = \frac{IRb - I_{Lim}(Ra + Rb) + V2 - V1}{I_{Lim}}$$

In Equation 2, "I" correspond to the current of the load 400, "Rb" corresponds to the internal resistance of the high output battery 200, "$I_{Lim}$" corresponds to a limited current of the high capacity battery 100, "Ra" corresponds the internal resistance of the high capacity battery 100, "V2" corresponds to the interval voltage of the high output battery 200, and "V1" corresponds to the internal voltage of high capacity battery 100. The minimum resistance value Rx of the variable resistor unit 300 may be calculated based on Equation 2.

Figure 2:
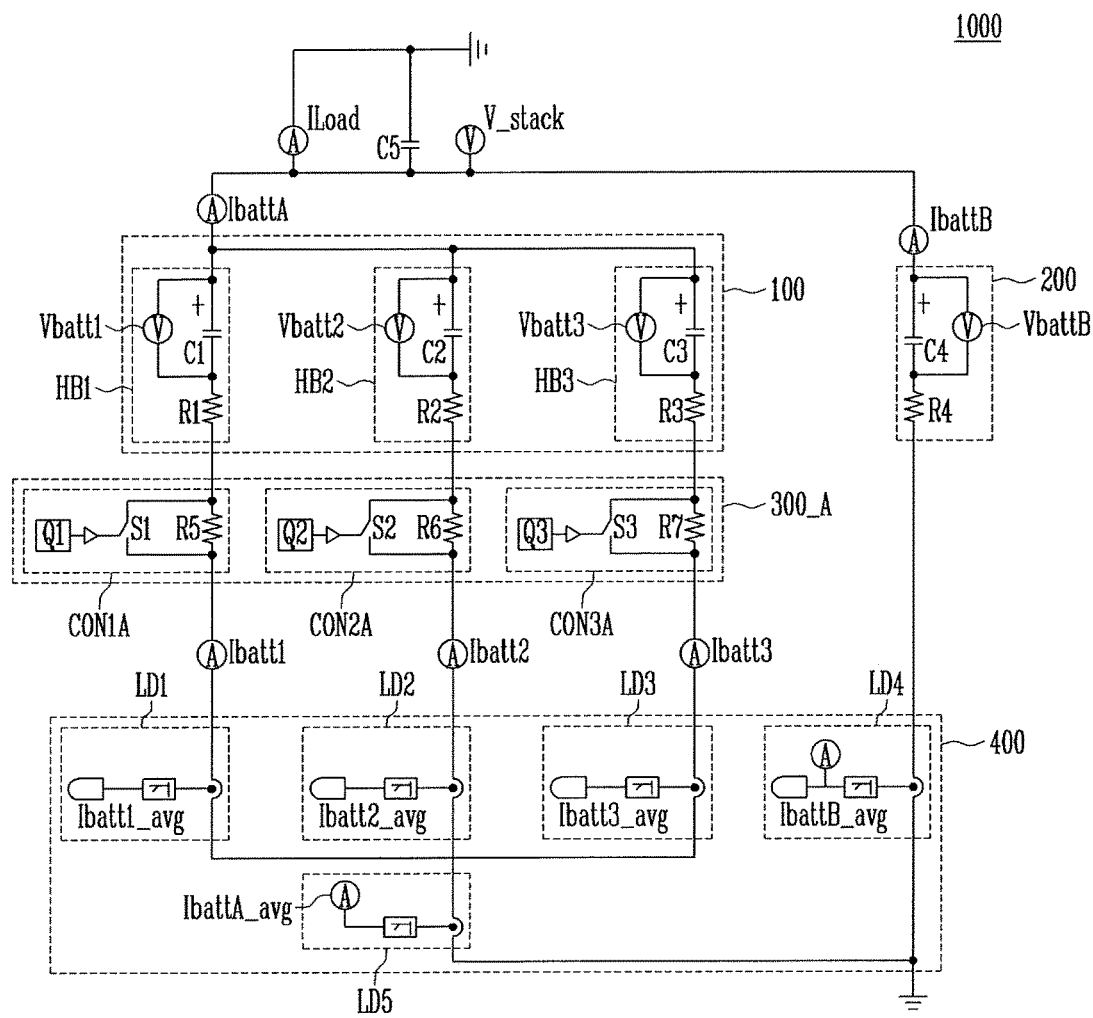
FIG. 2 illustrates an embodiment of the structure of the battery pack.

FIG. 2 illustrates an embodiment of the structure of the battery pack 1000. Referring to FIG. 2, the high capacity battery 100 of the battery pack 1000 includes a plurality of batteries HB1 to HB3. The variable resistor unit 300_A includes a plurality of sub controllers CON1A to CON3A. The load 400 includes a plurality of sub loads LD1 to LD5.

In the high capacity battery 100, the batteries HB1 to HB3 are connected in parallel and operated based on the phase transition method. Although three batteries HB1 to HB3 are illustrated in FIG. 2, the high capacity battery 100 may include a different number of batteries in another embodiment. The three batteries HB1 to HB3 include a first battery cell HB1, a second battery cell HB2, and a third battery cell HB3.

The battery cells HB1 to HB3 may be the same as or different from one other. For example, the first battery cell HB1 may include one or a plurality of first capacitors C1 and first resistors R1, and the voltage of the first battery cell HB1 may be defined as a first battery voltage Vbatt1. The second battery cell HB2 may include one or a plurality of second capacitors C2 and second resistors R2, and the voltage of the second battery cell HB2 may be defined as a second battery voltage Vbatt2. The third battery cell HB3 may include one or a plurality of third capacitors C3 and third resistors R3, and the voltage of the third battery cell HB3 may be defined as a third battery voltage Vbatt3. Positive (+) electrodes of the first to third battery cells HB1 to HB3 may be commonly connected to the same node, and the first to third resistors R1 to R3 may be connected from the positive (+) electrodes of the first to third battery cells HB1 to HB3 to the negative (−) electrodes, respectively.

The variable resistor unit 300_A controls the output of the high capacity battery 100 by controlling resistance. In the variable resistor unit 300_A, the first to third controllers CON1A to CON3A are connected to respective ones of the first to third batteries HB1 to HB3. The first to third sub controllers CON1A to CON3A may be same as or different from one another in terms of structure.

The first sub controller CON1A includes a fifth resistor R5 for transmitting current of the first battery cell HB1, and a first switch S1 which is turned on or turned off in response to a first sub current Q1. The terminals of the first switch S1 are connected to respective terminals of the firth resistor R5. When the first switch S1 is turned on, the current of the first battery cell HB1 does not flow through the fifth resistor R5 and flows through the first switch S1. When the first switch S1 is turned off, the current of the first battery cell HB1 does not flow through the first switch S1 and flows through the fifth resistor R5. The current flowing through the first sub controller CON1A may be defined as a first battery current Ibatt1. The first sub current Q1 for operating the first switch S1 is generated by a first switching controller.

The second sub controller CON2A includes a sixth resistor R6 for transmitting a current of the second battery cell HB2, and a second switch S2 which is turned on or turned off in response to a second sub current Q2. The terminals of the second switch S2 are connected to respective terminals of the sixth resistor R6. When the second switch S2 is turned on, the current of the second battery cell HB2 does not flow through the sixth resistor R6 and flows through the second switch S2. When the second switch S2 is turned off, the current of the second battery cell HB2 does not flow through the second switch S2 and flows through the sixth resistor R6. The current flowing through the second sub controller CON2A may be defined as a second battery current Ibatt2. The second sub current Q2 for operating the second switch S1 is generated by a second switching controller.

The third sub controller CON3A includes a seventh resistor R7 for transmitting a current of the third battery cell HB3, and a third switch S3 which is turned on or turned off in response to a third sub current Q3. The terminals of the third switch S3 are connected to respective terminals of the seventh resistor R7. When the third switch S3 is turned on, the current of the third battery cell HB3 does not flow through the seventh resistor R7 and flows through the third switch S3. When the third switch S3 is turned off, the current of the third battery cell HB3 does not flow through the third switch S3 and flows through the seventh resistor R7. The current flowing through the third sub controller CON3A may be defined as a third battery current Ibatt3. The third sub current Q3 for operating the third switch S3 is generated by a third switching controller.

The high output battery 200 comprises a battery cell which may be implemented with one or a plurality of fourth capacitors C4 and fourth resistors R4. The voltage of the high output battery 200 may be defined as a high output battery voltage VbattB. The high output battery 200 and the high capacity battery 100 may be connected to each other in parallel.

The load 400 may be used as a terminal when the high capacity battery 100 and the high output battery 200 are charged or discharged. For example, the load 400 includes first to fifth sub loads LD1 to LD5. The first to third sub loads LD1 to LD3 are connected between the variable resistor unit 300_A and the fifth sub load LD5. The fifth sub load LD5 is connected between the first to third sub loads LD1 to LD3 and a ground terminal. The fourth sub load LD4 is connected between the high output battery 200 and the ground terminal.

The current of the first sub load LD1 is a first battery average current Ibatt1_avg. The current of the second sub load LD2 is a second battery average current Ibatt2_avg. The current of the third sub load LD3 is a third battery average current Ibatt3_avg. Since the first to third sub loads LD1 to LD3 are connected to the fifth sub load LD5 in parallel, the current of the fifth sub load LD5 is a high capacity battery average current IbattA_avg. The current of the fourth sub load LD4 is a high output battery average current IbattB_avg.

Figure 3:
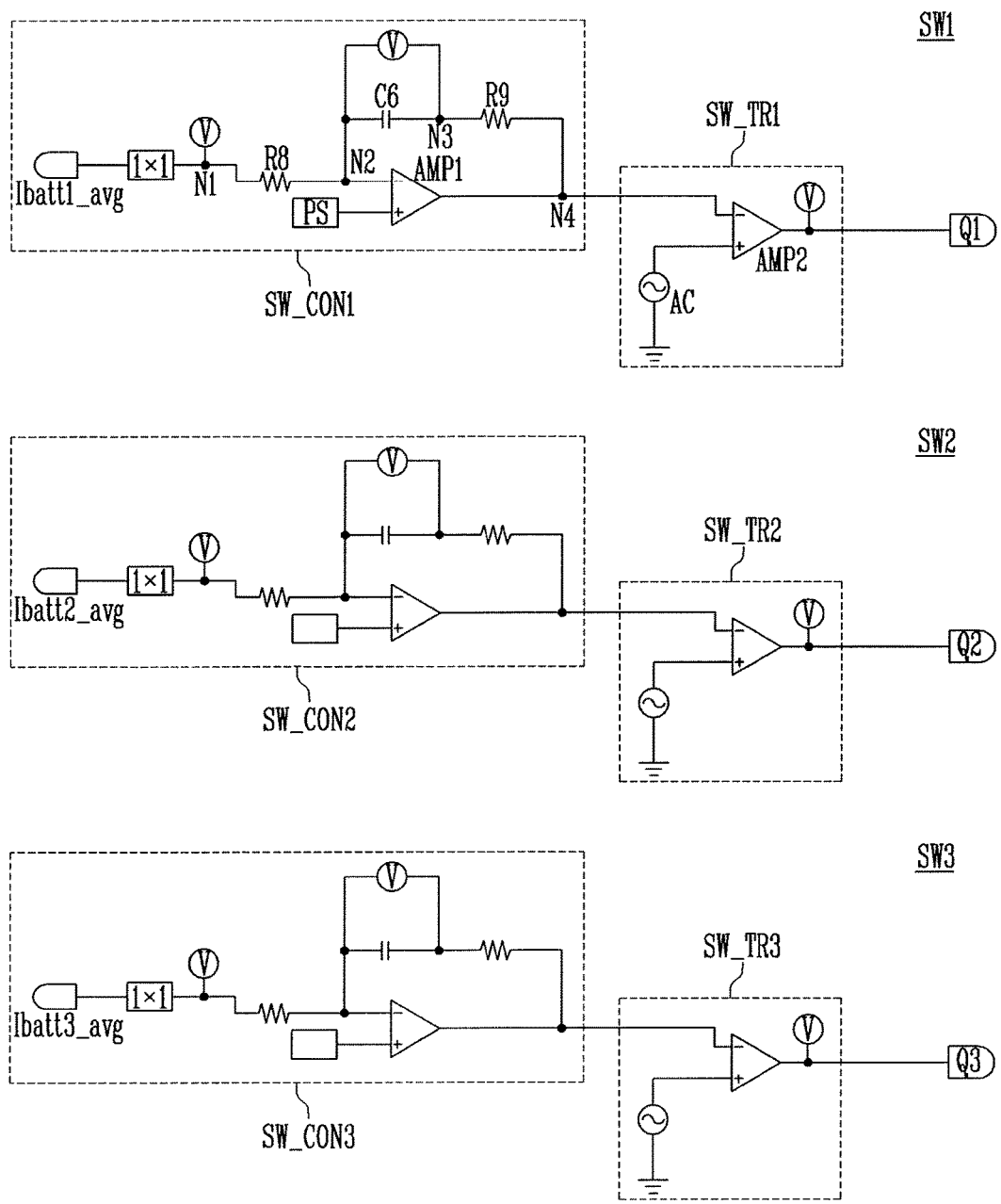
FIG. 3 illustrates an embodiment of a switching controller circuit.

FIG. 3 illustrates an embodiment of a switching controller circuit which includes a plurality switching controllers. Referring to FIG. 3, the first to third sub controllers CON1A to CON3A are operated based on first to third switching controllers SW1 to SW3. The first to third switching controllers SW1 to SW3 may be the same as each other in terms of structure, but may be operated based on different current.

The first switching controller SW1 includes a first controller SW_CON1 and a first transmitter SW_TR1. The first controller SW_CON1 includes resistors 1×1 connected between a terminal to which the first battery average current Ibatt1_avg is applied and a first node N1. The first switching controller SW1 also includes an eighth resistor R8 connected between the first node N1 and a second node N2, a sixth capacitor C6 connected between the second node N2 and a third node N3, a first comparator AMP1 for comparing the potential of the second node N2 and the output potential of a power supply PS and for outputting a comparison voltage to a fourth node N4, and a ninth resistor R9 connected between the third node N3 and a fourth node N4. The first transmitter SW_TR1 includes a second comparator AMP2 for comparing the comparison voltage applied to the fourth node N4 and the output voltage of Alternating Current (AC) power, and for outputting the first sub current Q1.

The second and third switching controllers SW2 and SW3 may have a structure similar to first switching controller SW1. For example, the second and third switching controllers SW2 and SW3 respectively included second and third controllers SW_CON2 and SW_CON3 having a structure similar the first controller SW_CON1 of the first switching controller SW1. The second and third switching controllers SW2 and SW3 also respectively include second and third transmitters SW_TR2 and SW_TR3 having a structure similar to the first transmitter SW_TR1 of the first switching controller SW1. The second switching controller SW_CON2 is operated based on the second battery average current Ibatt2_avg. The second transmitter SW_TR2 outputs the second sub current Q2 based on the comparison voltage output from the second switching controller SW_CON2. The third switching controller SW_CON3 is operated based on the third battery average current Ibatt3_avg. The third transmitter SW_TR3 outputs the third sub current Q3 based on the comparison voltage output from the third switching controller SW_CON3.

Figure 4:
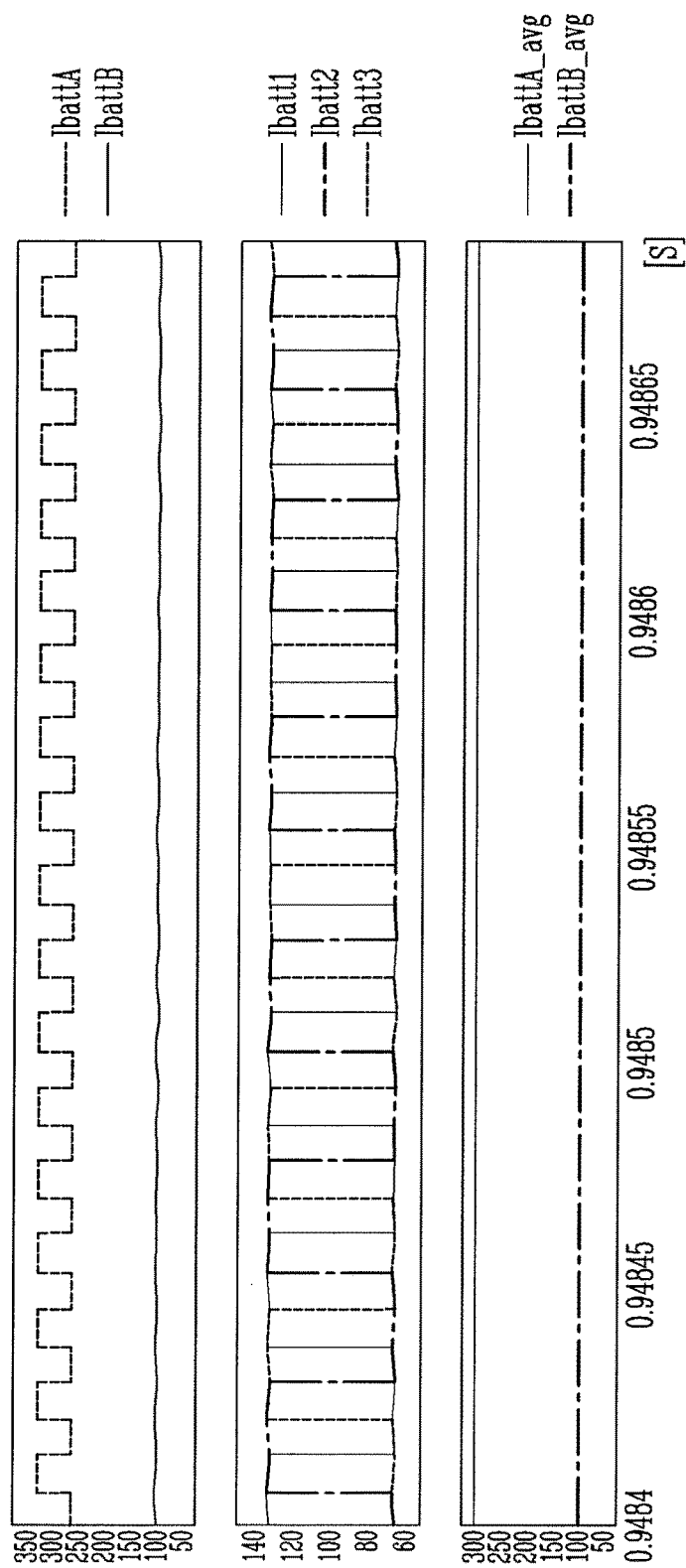
FIG. 4 illustrates an embodiment of a switching waveform for the battery pack.
Figure 5:
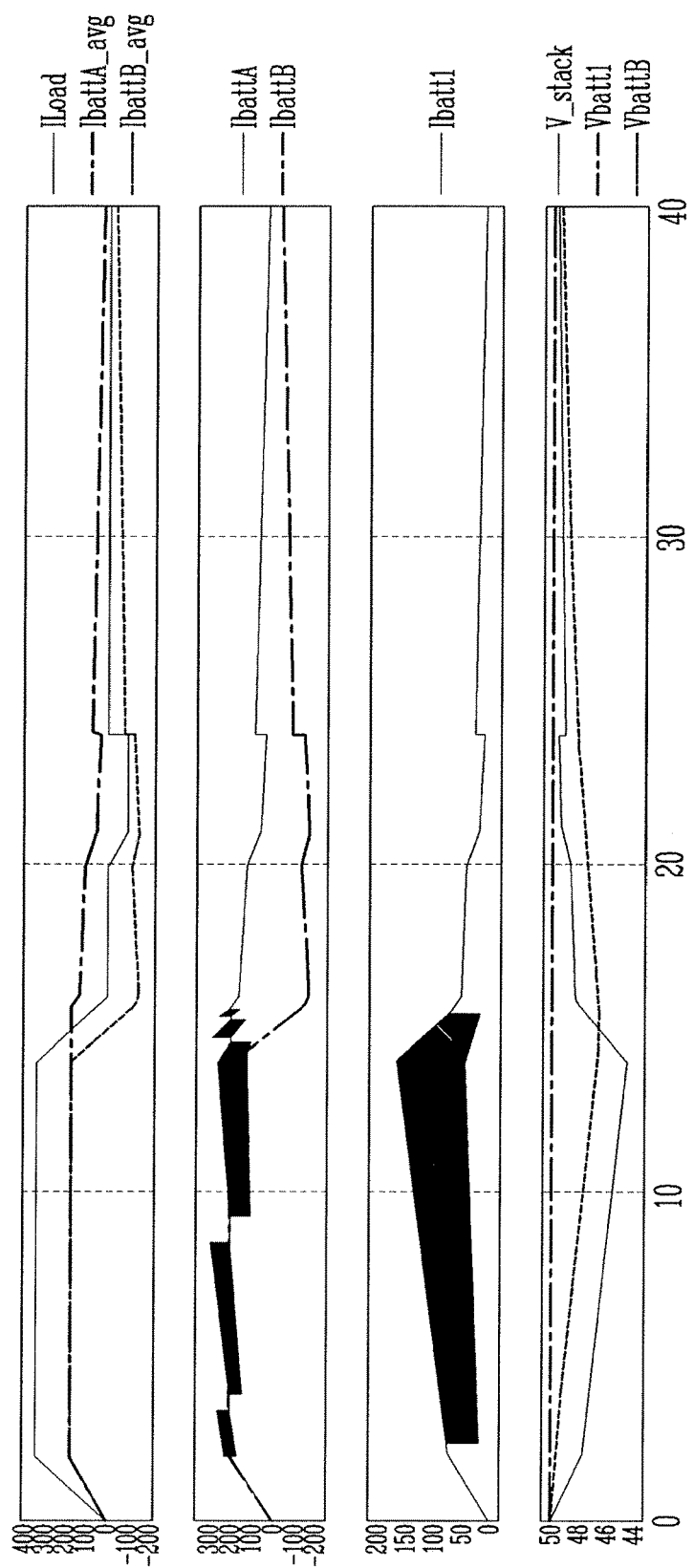
FIG. 5 illustrates an embodiment of a current waveform for the battery pack.

FIG. 4 illustrates an embodiment of a switching waveform for the battery pack 1000, and FIG. 5 illustrates an embodiment of a current waveform of battery pack 1000. Referring to FIG. 4, the horizontal axis indicates time (s) and the vertical axis indicates current (A). The high capacity battery average current IbattA_avg of the fifth load LD5 (see FIG. 2) has a predetermined first current value. The high output battery average current IbattB_avg of the fourth load LD4 (see FIG. 2) has a predetermined second current value less than the first current value. The first to third sub controllers CON1A to CON3A (see FIG. 2) are connected to each other in parallel and operate based on the first to third sub currents Q1 to Q3, respectively. As a result, the first to third battery currents Ibatt1, Ibatt2, and Ibatt3 of the first to third sub controllers CON1A to CON3A, respectively, have a pulse with a phase that constantly transitions.

Further, the first to third sub controllers CON1A to CON3A are operated by the first to third battery currents Ibatt1, Ibatt2, and Ibatt3 with a phase that constantly transitions. As a result, the high capacity battery current IbattA of the high capacity battery 100 has a pulse with a phase that constantly transitions. The high output battery 200 is operated based on the constant high output battery average current IbattB_avg. As a result, the high output battery current IbattB of the high output battery 200 has a constant current value. However, since the high output battery average current IbattB_avg is less than the high capacity battery average current IbattA_avg, the high output battery current IbattB has also a current value less than that of the high capacity battery current IbattA.

FIG. 5 illustrates an example of a test result obtained when the threshold value of high capacity battery 100 is 200 mA. From FIG. 5, it is seen that the high capacity battery current IbattA is limited to about 200 mA. The threshold value may be changed by adjusting the number of resistors or a resistance value of the variable resistor unit 300_A. For a current limit operation, the first to third sub controllers CON1A to CON3A are repeatedly turned on and turned off. The first battery current Ibatt1 may have a high frequency for a duration and the high capacity battery current IbattA may have a high frequency pulse (or ripple) for a duration. For example, the battery pack 1000 may limit the high capacity battery current IbattA up to the threshold value, but current having a high frequency pulse form may be temporally generated, so that there may be a limit in the extension of the life cycle of the battery pack 1000. In order to restrict generation of current having a high frequency pulse form, a filter may be included in the battery pack.

Figure 6:
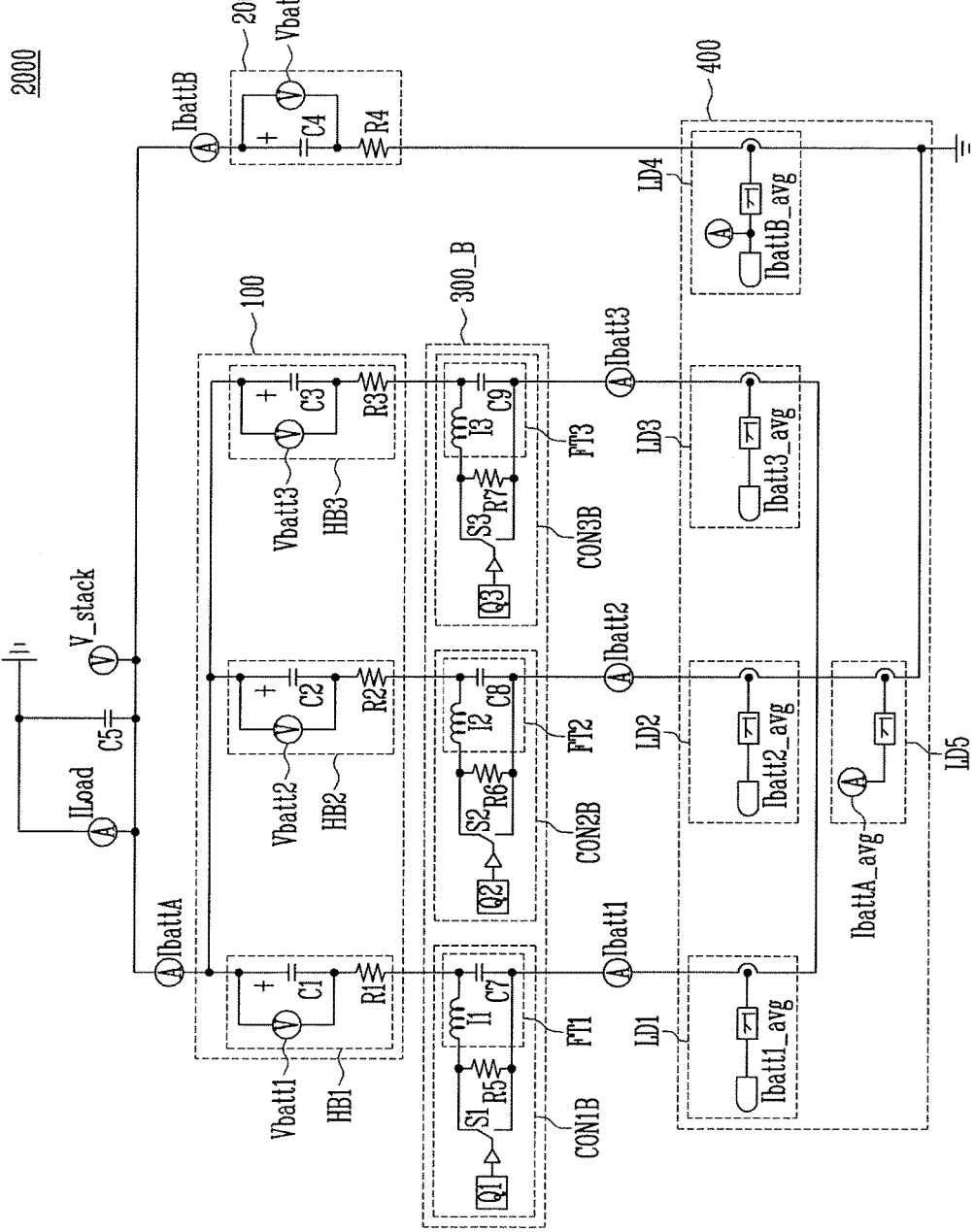
FIG. 6 illustrates another embodiment of the structure of a battery pack.

FIG. 6 illustrates an embodiment of a battery pack 2000 having a similar configuration to the battery pack 1000, except that a filter is included in the variable resistor 300_B. The battery pack 2000 includes a high capacity battery 100 and a high output battery 200. The high capacity battery 100 has a plurality of batteries HB1 to HB3. Accordingly, the variable resistor 300_B may have a plurality of sub controllers CON1A to CON3A. A load 400 may include a plurality of sub loads LD1 to LD5.

The high capacity battery 100 includes the batteries HB1 to HB3 which are connected in parallel and operated by the phase transition method. While three batteries HB1 to HB3 are illustrated in FIG. 6, a different number of batteries may be included in another embodiment. The three batteries HB1 to HB3 may be defined as a first battery cell HB1, a second battery cell HB2, and a third battery cell HB3. The first to third battery cells HB1 to HB3 may be similar to each other.

For example, the first battery cell HB1 may be implemented with one or a plurality of first capacitors C1 and first resistors R1, and the voltage of the first battery cell HB1 may be defined as a first battery voltage Vbatt1. The second battery cell HB2 may be implemented with one or a plurality of second capacitors C2 and second resistors R2, and the voltage of the second battery cell HB2 may be defined as a second battery voltage Vbatt2. The third battery cell HB3 may be implemented with one or a plurality of third capacitors C3 and third resistors R3, and a voltage of the third battery cell HB3 may be defined as a third battery voltage Vbatt3. Positive (+) electrodes of the first to third battery cells HB1 to HB3 may be commonly connected to the same node. The first to third resistors R1 to R3 may be connected from the positive (+) electrodes of the first to third battery cells HB1 to HB3 to negative (−) electrodes, respectively.

The variable resistor 300_B controls output of the high capacity battery 100 by controlling resistance. The variable resistor 300_B may include first to third controllers CON1B to CON3B respectively connected to the first to third batteries HB1 to HB3. The first to third sub controllers CON1B to CON3B may have a similar structure.

The first sub controller CON1B includes a first switch S1 which is turned on or turned off in response to a first sub current Q1, a fifth resistor R5 connected between both terminals of the first switch S1, and a first filter FT1 configured so that the first sub current Q1 may stably flow. The first filter FT1 may include a first impedance I1 for restricting a high frequency current and a seventh capacitor C7. The seventh capacitor C7 may be connected between the first battery cell HB1 and the first load LD1. The first impedance I1 may be connected between a node between the first battery cell HB1 and the first load LD1 and one terminal of the fifth resistor R5. Accordingly, even though the first switch S1 is turned on or turned off, a high frequency pulse of the first battery current Ibatt1 may be removed by the first filter FT1, so that the high capacity battery current IbattA may be stably generated.

The second sub controller CON2B includes a second switch S2 turned on or turned off in response to a second sub current Q2, a seventh resistor R6 connected between both terminals of the second switch S2, and a second filter FT1 configured so that the second sub current Q2 may stably flow. The second filter FT2 may include a second impedance I2 for restricting a high frequency current and an eighth capacitor C8. The eighth capacitor C8 may be connected between the second battery cell HB2 and the second load LD2. The second impedance I2 may be connected between a node between the second battery cell HB2 and the second load LD2 and one terminal of the sixth resistor R6. Accordingly, even though the second switch S2 is turned on or turned off, a high frequency pulse of the second battery current Ibatt2 may be removed by the second filter FT2, so that the high capacity battery current IbattA may be stably generated.

The third sub controller CON3B includes a third switch S3 turned on or turned off in response to a third sub current Q3, a seventh resistor R7 connected between both terminals of the third switch S3, and a third filter FT3 configured so that the third sub current Q3 may stably flow. The third filter FT3 may include a third impedance I3 for restricting a high frequency current and a ninth capacitor C9. The ninth capacitor C9 may be connected between the third battery cell HB3 and the third load LD1. The third impedance I3 may be connected between a node between the third battery cell HB3 and the third load LD3 and one terminal of the seventh resistor R7. Accordingly, even though the third switch S3 is turned on or turned off, a high frequency pulse of the third battery current Ibatt3 may be removed by the third filter FT3, so that the high capacity battery current IbattA may be stably generated.

The high output battery 200 comprises a battery cell which may be implemented with one or a plurality of fourth capacitors C4 and fourth resistors R4. The voltage of the high output battery 200 may be defined as a high output battery voltage VbattB. The high output battery 200 and the high capacity battery 100 may be connected with each other in parallel.

The load 400 is used as a terminal when the high capacity battery 100 and the high output battery 200 are charged or discharged. For example, the load 400 includes first to fifth sub loads LD1 to LD5. The first to third sub loads LD1 to LD3 may be connected between the variable resistor 300_B and the fifth sub load LD5. The fifth sub load LD5 may be connected between the first to third sub loads LD1 to LD3 and a ground terminal. The fourth sub load LD4 may be connected between the high output battery 200 and the ground terminal.

The current of the first sub load LD1 is a first battery average current Ibatt1_avg. The current of the second sub load LD2 is a second battery average current Ibatt2_avg. The current of the third sub load LD3 is a third battery average current Ibatt3_avg. Since the first to third sub loads LD1 to LD3 are connected to the fifth sub load LD5 in parallel, the current of the fifth sub load LD5 is a high capacity battery average current IbattA_avg. The current of the fourth sub load LD4 is a high output battery average current IbattB_avg.

Figure 7:
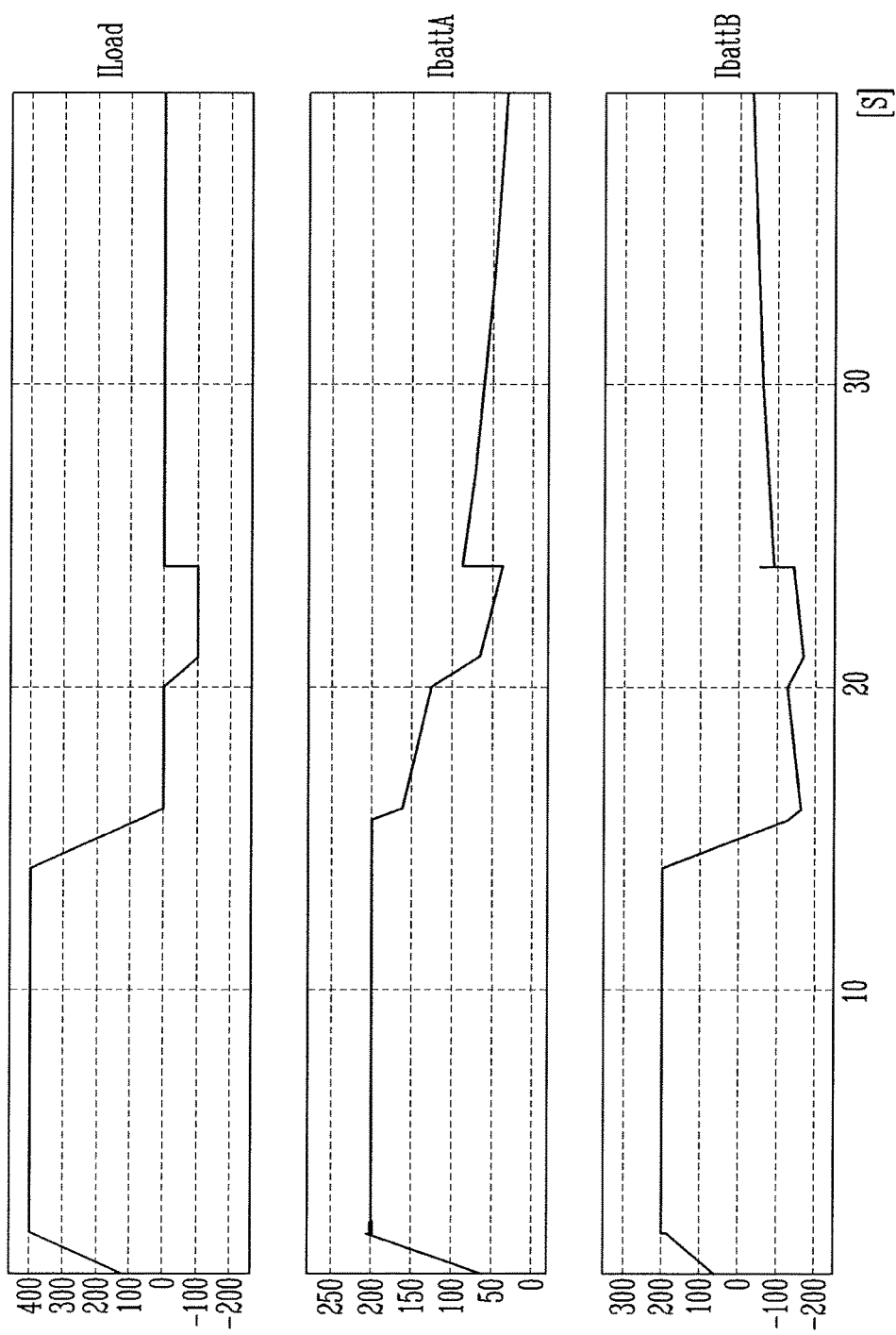
FIG. 7 illustrates an embodiment of a waveform for the battery pack in FIG. 6.

FIG. 7 illustrates an example of a current waveform for the battery pack 2000. Referring to FIG. 7, it is seen that a high frequency pulse form (ripple) of the high capacity battery current IbattA is removed by the first to third filters FT1, FT2, and FT3 in the battery pack 2000 of FIG. 6.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A battery pack, comprising:
   a first battery with a first capacity, the first battery including a plurality of sub-batteries connected in parallel;
   a second battery with a second capacity less than the first capacity, the second battery having a larger maximum discharge current than the first battery; and
   a variable resistor circuit connected between the first battery and a load, the variable resistor circuit including a plurality of current limiting circuits, each of the plurality of current limiting circuits connected to a corresponding sub-battery among the plurality of sub-batteries in serial, wherein the load includes a plurality of sub-loads, each of the plurality of sub-loads connected to a corresponding sub-battery among the plurality of sub-batteries in serial and to output an average current of the corresponding sub-battery, wherein each of the plurality of current limiting circuits includes:

a capacitor connected to the corresponding sub-battery in serial between a first node and a second node;

an inductor connected between the first node and a third node;

a resistor connected between the third node and the second node;

a switch connected to the resistor in parallel; and a switching controller to receive the average current of the corresponding sub-battery from a corresponding sub-load among the plurality of sub-loads and to output a pulse signal with a duty ratio to the switch.

2. The battery pack as claimed in claim 1, wherein the plurality of current limiting circuits have substantially same structures.

3. The battery pack as claimed in claim 1, wherein:

a plurality of switching controllers of the plurality of current limiting circuits output a plurality of pulse signals, and the plurality of pulse signals are phase-shifted from each other.

4. The battery pack as claimed in claim 1, wherein the switch is turned on when the pulse signal output by the switching controller has a first level, and the switch is turned off when the pulse signal output by the switching controller has a second level.

5. The battery pack as claimed in claim 1, wherein:

the first battery and the variable resistor are connected in serial, and the second battery is connected to the first battery and the variable resistor circuit in parallel.

6. The battery pack as claimed in claim 1, wherein the variable resistor circuit is controlled such that a discharge current of the first battery is limited to a predetermined limit current value.

7. The battery pack as claimed in claim 6, wherein as a total current supplied to the load by the first and second batteries is increased, a discharge current of the second battery is increased and the discharge current of the first battery is controlled to be maintained to the predetermined limit current value by the variable resistor circuit.

8. The battery pack as claimed in claim 6, wherein the predetermined limit current value corresponds to a maximum discharge current of the first battery.

* * * * *